(12) United States Patent
Knipfer et al.

(10) Patent No.: US 8,140,180 B2
(45) Date of Patent: Mar. 20, 2012

(54) DYNAMIC ITEM-SPACE ALLOCATION AND RETRIEVAL

(75) Inventors: Ivory W. Knipfer, Rochester, MN (US); Jason S. Lee, Oronoco, MN (US); Antoine G. Sater, Rochester, MN (US); Manivannan Thavasi, Rochester, MN (US); Yajun Tu, ShenZhen (CN)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 11/967,152

(22) Filed: Dec. 29, 2007

(65) Prior Publication Data

US 2009/0169352 A1    Jul. 2, 2009

(51) Int. Cl.
G06F 7/00    (2006.01)
(52) U.S. Cl. ........ 700/214; 700/213; 700/215; 700/219; 700/225; 700/226
(58) Field of Classification Search ............... 700/213, 700/214, 215, 219, 225, 226
See application file for complete search history.

(56) References Cited

U.S. PATENT DOCUMENTS

| | | | | |
|---|---|---|---|---|
| 5,953,234 A * | 9/1999 | Singer et al. | ................. | 700/214 |
| 6,332,098 B2 * | 12/2001 | Ross et al. | ................... | 700/226 |
| 2006/0271234 A1 * | 11/2006 | Gaug et al. | ..................... | 700/213 |
| 2007/0021864 A1 * | 1/2007 | Mountz et al. | ................ | 700/216 |

* cited by examiner

Primary Examiner — Gene Crawford
Assistant Examiner — Yolanda Cumbess
(74) Attorney, Agent, or Firm — Steven M. Greenberg, Esq.; Carey, Rodriguez, Greenberg & O'Keefe (57) ABSTRACT

Embodiments of the present invention address deficiencies of the art in respect to staging manufactured items and provide a method, system and computer program product for staging items in a manufacturing environment. In an embodiment of the invention, a method for staging items in a manufacturing environment can be provided. The method can include defining attributes of staging locations in a distribution area of the manufacturing environment, defining a set of staging strategies for use in the distribution area of the manufacturing environment, receiving a manufactured item in the distribution area and obtaining characteristics of the manufactured item, comparing the obtained characteristics of the manufactured item to the set of staging strategies to select the staging strategy to apply to the manufactured item and applying the selected staging strategy to the manufactured item to assign the manufactured item to storage in one of the staging locations in the distribution area based on matching the obtained characteristics of the manufactured item to the defined attributes of the one of the staging locations. The method can further include the retrieval of the manufactured item from the staging location at the appropriate time to allow for subsequent processing or shipment, and may include multiple iterations of the staging-retrieval process as required by the particular implementation.

18 Claims, 8 Drawing Sheets

STAGING MANAGEMENT RULES 150

FIG. 3A

CONTAINER CHARACTERISTICS TABLE 340

| Ctr Type | Item Number | Type of Sys. | Brands | L (m) | W (m) | WT (kg) | Major Axis | Attributes/ Limitations |
|---|---|---|---|---|---|---|---|---|
| AB | | *ALL | *ALL | 0.5 | 0.8 | | L | |
| LM | | *ALL | *ALL | 0.6 | 0.8 | | L | |
| ON | | *ALL | Q | 0.7 | 0.8 | 20 | L | RF Sensitive Class 3 |
| ON | 19K1234 | *ALL | *ALL | 0.7 | 0.8 | | L | |
| TW | | *ALL | I | 1.2 | 1.4 | | L | |

FIG. 3E

STAGING LOCATIONS TABLE 310

| Bldg | Dock | Area | Plane | Location | L (m) | W (m) | CAP (kg) | Major Axis | Type List | Type Qty | Fill Stat | Space Alg | Iteration Number | Ctr size buffer x-y | Over-flow Limit | Dock Prox. | Current Carrier | Attributes/ limitations |
|---|---|---|---|---|---|---|---|---|---|---|---|---|---|---|---|---|---|---|
| 203 | 203-1 | *ALL | *ALL | *ALL | | | | W | *ALL | | | B | 10 | | 3 | | | |
| 203 | 203-1 | Tower | Plane1 | Loc1 | 2 | 4 | | | TW | | | B | | | | 2 | | |
| 203 | 203-1 | Tower | Plane1 | Loc2 | 2 | 4 | | | TW | | F | B | | | | 2 | | |
| 203 | 203-1 | Ship1 | Plane2 | Loc1 | 2 | 4 | 200 | | //TW | | | B | | | | 2 | | |
| 203 | 203-1 | Ship Lane | Plane1 | Loc1 | 10 | 4 | | | | | | B | | | 1 | 1 | Geodis | |
| 110 | 110-1 | Ship Lane | Plane1 | Loc1 | 10 | 4 | | | | | | B | | | 1 | 1 | Fedex | |
| 104 | 104-1 | *ALL | *ALL | *ALL | | | | W | *ALL | ON10 | | N | | 0.1-0.1 | | | | |
| 104 | 104-1 | FG8 | Plane3 | Loc8 | 0.5 | 0.2 | 40 | | *ALL | | | N | | | | | | RF Sens Class 3 |

FIG. 3B

STAGING STRATEGY CONTROL TABLE 320

| Strategy Name | Priority | Active | Date Range Start | Date Range End | Entity Type | Type of Sys. | Ctr Type | Brands | Carrier | Mode | Ship to Nation List | Within Ship Window? | Within Ship Date Range? | Bldg | Dock | Area | Plane | Location | Staging Strategy |
|---|---|---|---|---|---|---|---|---|---|---|---|---|---|---|---|---|---|---|---|
| 203-1 | 1 | Y | | | 0ABD23 | 3/4 | *ALL | – | *ALL | *ALL | *ALL | N | | 203 | 203-1 | Ship1 | *ALL | *ALL | Entity Tie |
| 203-2 | 1 | Y | | | 0ABD23 | 3/4 | TW | – | *ALL | *ALL | *ALL | N | | 203 | 203-1 | Tower | *ALL | *ALL | Space by Ctr Type |
| 203-3 | 1 | Y | | | 0ABD23 | 3/4 | *ALL | – | *ALL | *ALL | *ALL | Y | | 203 | 203-1 | SH Lane | *ALL | *ALL | Carrier |
| 203-4 | 2 | N | EOMB | EOME | 0ABD23 | 3/4 | *ALL | – | *ALL | *ALL | *ALL | N | 1 week | 203 | 203-1 | Over-flow | *ALL | *ALL | Ship date |
| 203-5 | 1 | Y | | | 0ABD23 | 1/2 | *ALL | – | *ALL | *ALL | *ALL | N | | 203 | 203-1 | MES | *ALL | *ALL | Space by Item Number |
| 110-1 | 1 | Y | | | | 7/8 | *ALL | Q/X | *ALL | *ALL | *ALL | N | 2 weeks | 110 | 110-1 | Stage 1 | *ALL | *ALL | Space by Ctr Type |
| 104-1 | 1 | Y | | | | 3/4/5/6 | *ALL | X/Z | *ALL | Air | *ALL | N | | 104 | 104-1 | Over-flow | *ALL | *ALL | Entity Tie |
| 104-2 | 2 | N | EOQB | EOQE | | 3/4/5/6 | *ALL | X/Z | *ALL | Air | *ALL | N | 1 week | 104 | 104-1 | FG1 | *ALL | *ALL | User Defined 1 |

FIG. 3C

CONTAINER TRACKING TABLE 330

| Ship Entity | Build Entity | CTR # | CTR Type | Item Number | Carrier | Mode | Type of Sys. | Brnd | Major Axis | L (m) | W (m) | Wt (kg) | Bldg | Dock | Area | Plane | Location | X | Y | Loc Stat |
|---|---|---|---|---|---|---|---|---|---|---|---|---|---|---|---|---|---|---|---|---|
| 0ABD23 | 1AB124 | 006FVCYD00 | AB | | Geodis | Gnd | 3-Dom | | L | 0.5 | 0.8 | 35 | 203 | 203-1 | Ship 1 | Plane3 | Loc8 | 0 | 0 | L |
| 0ABD23 | 1AB124 | 006FVCYD01 | TW | | Geodis | Gnd | 3-Dom | | L | 1.2 | 1.4 | 490 | 203 | 203-1 | Tower | Plane1 | Loc3 | 0 | 0 | L |
| 0ABD23 | 1AB124 | 006FVCYD02 | TW | | Geodis | Gnd | 3-Dom | | L | 1.2 | 1.4 | 850 | 203 | 203-1 | Tower | Plane1 | Loc2 | 0 | 0 | L |
| 0ABD23 | 1AB124 | 006FVCYD03 | TW | | Geodis | Gnd | 3-Dom | | L | 1.2 | 1.4 | 850 | 203 | 203-1 | Ship1 | Plane1 | Loc1 | 0.7 | 0 | L |
| 0ABD23 | 1AB124 | 006FVCYD04 | AB | | Geodis | Gnd | 3-Dom | | L | 0.5 | 0.5 | 20 | 203 | 203-1 | Ship1 | Plane3 | Loc8 | 1.4 | 0 | L |
| 0ABD23 | 1AB124 | 006FVCYD05 | AB | | Geodis | Gnd | 3-Dom | | L | 0.5 | 0.7 | 21 | 110 | 110-1 | Ship1 | Plane3 | Loc8 | 0 | 0 | A |
| 00123 | 1AB784 | 006FVCYE00 | ON | 19K1234 | Fedex | Air | 8-WTFG | Q | L | 0.6 | 0.6 | 20 | 104 | 104-1 | FG1 | Plane2 | Loc5 | 0 | 0 | L |
| 001XX3 | 1AB784 | 006FV92300 | LM | | Airbrne | Air | 4-WT | Z | L | 1.2 | 0.8 | 40 | 104 | 104-1 | Airlane | Plane1 | Loc2 | 0.8 | 8.0 | LM |

DYNAMIC ITEM-SPACE ALLOCATION AND RETRIEVAL

BACKGROUND OF THE INVENTION

1. Statement of the Technical Field

The present invention relates to integrated supply chain management and more particularly to a distribution management system utilizing user-defined space characteristics and staging analysis.

2. Description of the Related Art

As the global economy provides a proliferation of options for businesses to expand into emerging markets, manufacturing success is increasingly defined by how fast you act and how well you react to supply chain volatility. Modern manufacturing facilities are increasingly becoming more complex as customers expect manufacturers to keep prices low while readily accommodating last-minute changes in quantity, product configuration or delivery date.

Modern manufacturing facilities can produce scores of different types of goods from small shelf stocked items to large configure-to-order (CTO) multi-rack enterprise services. In many cases, these products are individual CTO products that are unique to a particular customer. These products have variable sizes, variable time-to-build cycle times, and may exit manufacturing as individual items or in groups. The manufacturing facilities can have multiple production lines producing many different goods that congregate for shipment at various shipping docks. With numerous shipping docks, numerous potential carriers and/or shippers to service each dock, multiple areas that service certain modes of shipping e.g., air vs. ground, and physical space restrictions, the staging and movement of customer shipments to the shipping lanes has become a daunting task.

These factors can combine to create a complex routing scenario for a product once it leaves the manufacturing realm and enters distribution. Current distribution or warehouse management systems do not properly manage the utilization of the dock/ship lanes and finished goods warehouse staging areas to effectively control the staging of items, the consolidation of shipping entities, the application of various staging strategies and the optimization of available space.

Current distribution or warehouse management systems generally are intended for use with fixed part numbers with fixed locations for storage and retrieval. These distribution or warehouse management systems are not intended for products variable in size, variable in quantity, and pulled by a customer that does not follow the traditional last in first out (LIFO)/first in first out (FIFO) or part bin management principles. Furthermore, traditional distribution or warehouse management systems lack the ability to model different staging strategies based on the specific characteristics about an order, e.g., the "dock" that a shipment is "intended for". Additionally, these distribution or warehouse management systems lack the ability to create staging strategies that combine the relationship of physical entities to one another, e.g., placing four different sized CTO items in certain area while placing all ship group boxes for this customer in an adjacent location for ease of customer ship entity management.

SUMMARY OF THE INVENTION

Embodiments of the present invention address deficiencies of the art in respect to staging manufactured items and provide a novel and non-obvious method, system and computer program product for staging items in a manufacturing environment. In an embodiment of the invention, a method for staging items in a manufacturing environment can be provided. The method can include defining attributes of staging locations in a distribution area of the manufacturing environment, defining a set of staging strategies for use in the distribution area of the manufacturing environment, receiving a manufactured item in the distribution area and obtaining characteristics of the manufactured item, comparing the obtained characteristics of the manufactured item to the set of staging strategies to select the staging strategy to apply to the manufactured item and applying the selected staging strategy to the manufactured item to assign the manufactured item to storage in one of the staging locations in the distribution area based on matching the obtained characteristics of the manufactured item to the defined attributes of the one of the staging locations.

In one aspect of the embodiment, the method further can include updating an item tracking record to reflect the assigned staging location. In another aspect of the embodiment, the method further can include updating an item tracking record to reflect the assigned staging location. In yet another aspect of the embodiment, the method further can include applying space optimization usage logic to the assigned staging location to determine a storage position for the manufactured item in the assigned staging location based on container characteristics of the manufactured item.

In another preferred embodiment of the invention, a system for staging items in a manufacturing environment can be provided. The system can include a data store of manufactured items and staging locations for storing the manufactured items. The system further can include an item staging engine communicatively coupled to a distribution system and the data store. The system further can include item staging logic. The logic can include program code enabled to define attributes of staging locations in a distribution area of the manufacturing environment, to define a set of staging strategies for use in the distribution area of the manufacturing environment, to receive one of the manufactured items in the distribution area and obtain characteristics of the manufactured item, to compare the obtained characteristics of the manufactured item to the set of staging strategies and select the staging strategy to apply to the manufactured item, and to apply the selected staging strategy to the manufactured item and assign the manufactured item to storage in one of the staging locations based on matching the obtained characteristics of the manufactured item to the defined attributes of the one of the staging locations.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for staging items e.g., containers, in a manufacturing environment based on item attributes, location characteristics, and entity attributes. In accordance with an embodiment of the present invention, attributes of staging locations in a distribution area of a manufacturing environment can be defined. Also, a set of staging strategies for use in the distribution area of the manufacturing environment can be defined. Thereafter, a manufactured item can be received in the distribution area and the characteristics of the manufactured item can be obtained. The obtained characteristics of the manufactured item are compared to a set of staging strategies to select a staging strategy. The selected staging strategy is applied to the manufactured item and a staging location is assigned based on matching the obtained characteristics of the manufactured item to the defined attributes of the staging locations.

In accordance with another embodiment of the present invention, a system to create new methods, models and set of algorithms to determine optimum staging (storage and retrieval) of manufacturing containers as they complete manufacturing (or when received from suppliers) in preparation for shipment. The models allow maximum use of the physical facilities while making tradeoffs for other factors such as customer shipment, order destination, physical characteristics, carrier, mode of transportation, overflow areas, delivery completeness, shipment lanes, etc.

Figure 1:
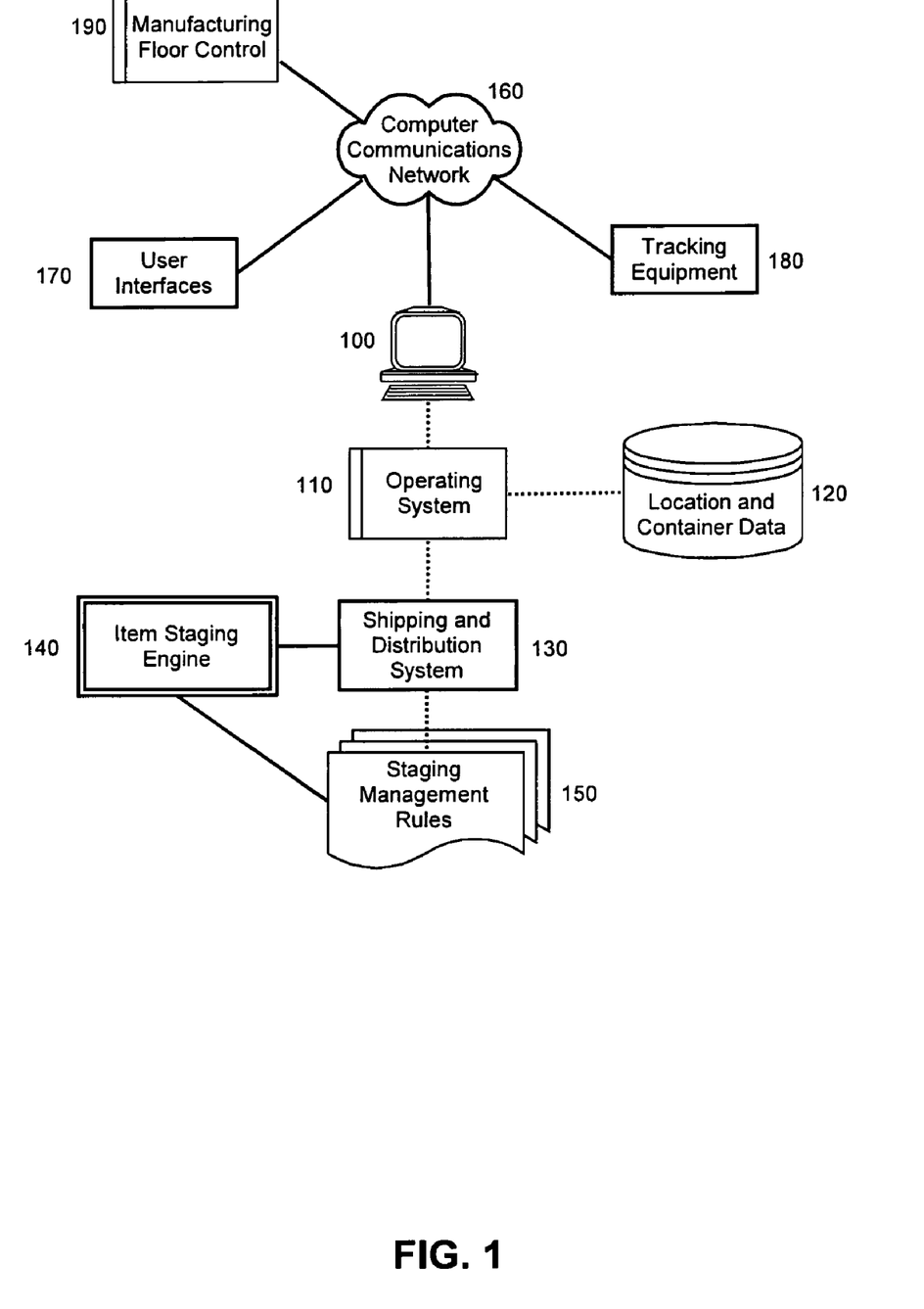
FIG. 1 is a schematic illustration of an item based shipping and distribution system utilizing an item staging engine.

In illustration, FIG. 1 is a schematic illustration of a shipping and distribution system utilizing an item staging (allocation/retrieval) engine. A computer 100 with an operating system 110 can be coupled to a database 120 of product management data including container information, product order characteristics and staging location characteristics. A shipping and distribution system 130 can be coupled to an item staging engine 140. The staging management rules 150 can be coupled to the shipping and distribution system 130 and the item staging engine 140. The staging management rules 150 can enable the shipping and distribution system 130 or the item staging engine 140 to apply a staging strategy based on numerous factors including but not limited to physical characteristics of items (products and containers), types of orders, area/location characteristics, physical space restrictions, and shipment method. The computer 100 can be coupled to manufacturing floor controller 190, user interface 170 and also tracking equipment 180 over computer communications network 160 for receiving and tracking items from manufacturing and within distribution.

Figure 2:
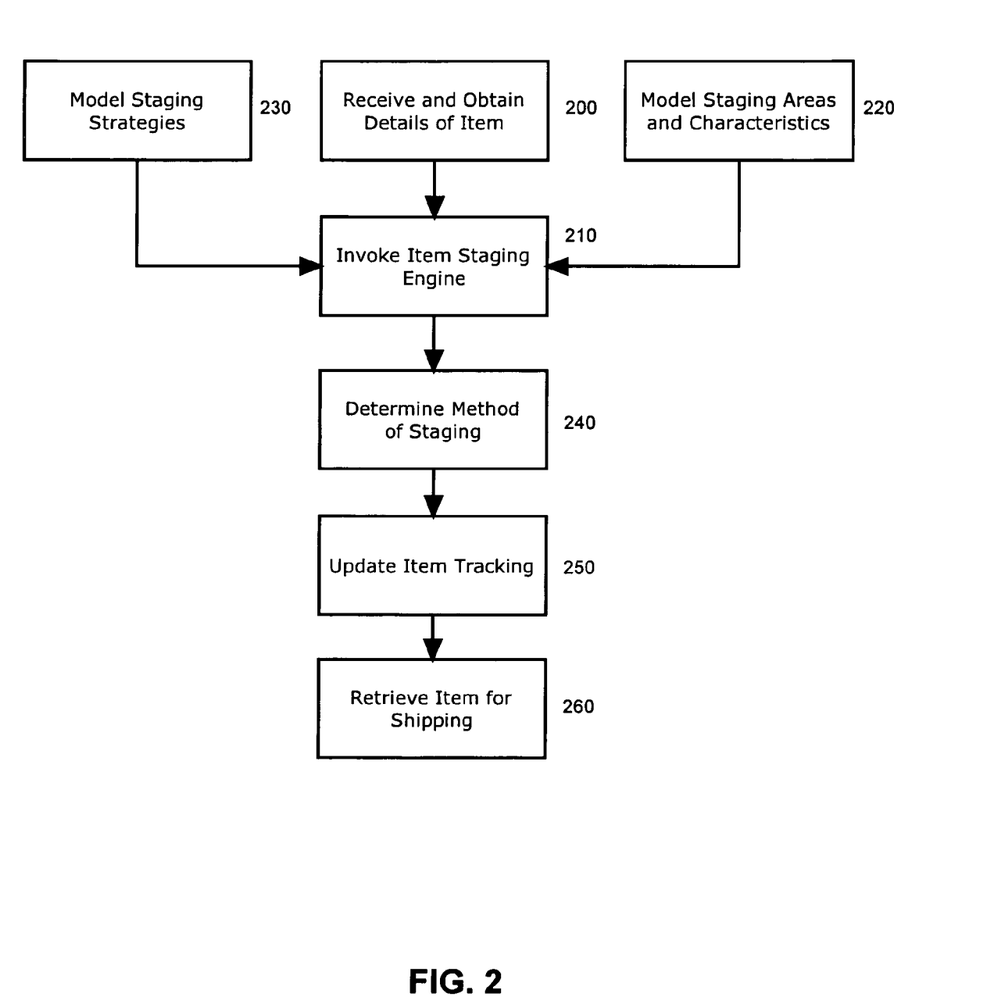
FIG. 2 is a flowchart illustrating a process for item staged shipping and distribution analysis.

In further illustration, FIG. 2 is a flowchart illustrating a process for user-defined space staging analysis in a manufacturing supply chain process. In block 200, a manufactured item can be received from manufacturing and the details of the manufactured item can include a type of entity, type of order, type of container, type of item (machine or product), ship date factors, mode of shipment, carrier and shipping/staging location. In block 210, the item staging engine 140 can be invoked by computer 100 or shipping and distribution system 130 during post manufacturing. In block 220, the item staging engine 140 can include staging location logic for modeling or defining a set of staging areas/locations in a manufacturing facility with their corresponding characteristics and attributes. Typically, the modeling of the staging areas/locations will occur once, e.g., during an initialization stage of the system; however, the modeling can occur multiple times, e.g., at user-defined stages.

Additionally, in block 230, the item staging engine 140 can include staging strategy logic for modeling a set of staging strategies based on the characteristics of a manufactured item and any other user-defined parameters. The staging location logic and the staging strategy logic can be coupled to the item staging engine 140 either directly as part of the computing system or remotely through an application programming interface (API) of the computing system. The staging strategy logic can include program code enabled to analyze the manufactured item, its related characteristics and the available staging location characteristics in order to select a staging strategy most responsive to that particular manufactured item. Typically, the modeling of the staging strategies will occur once, e.g., during an initialization stage of the system; however, the modeling can occur multiple times, e.g., at user-defined stages.

In an embodiment of the system, item staging logic can include program code enabled to define attributes of staging locations in a distribution area of the manufacturing environment, to define a set of staging strategies for use in the distribution area of the manufacturing environment, to receive one of the manufactured items in the distribution area and obtain characteristics of the manufactured item, to compare the obtained characteristics of the manufactured item to the set of staging strategies and select the staging strategy to apply to the manufactured item, and to apply the selected staging strategy to the manufactured item and assign the manufactured item to storage in one of the staging locations based on matching the obtained characteristics of the manufactured item to the defined attributes of the one of the staging locations. The item staging engine 140 is discussed in greater detail with reference to FIGS. 4 and 5. Staging management rules, staging locations, staging strategies, container tracking and container characteristics are discussed in greater detail with reference to the tables of FIGS. 3A through 3E.

Figure 3A:
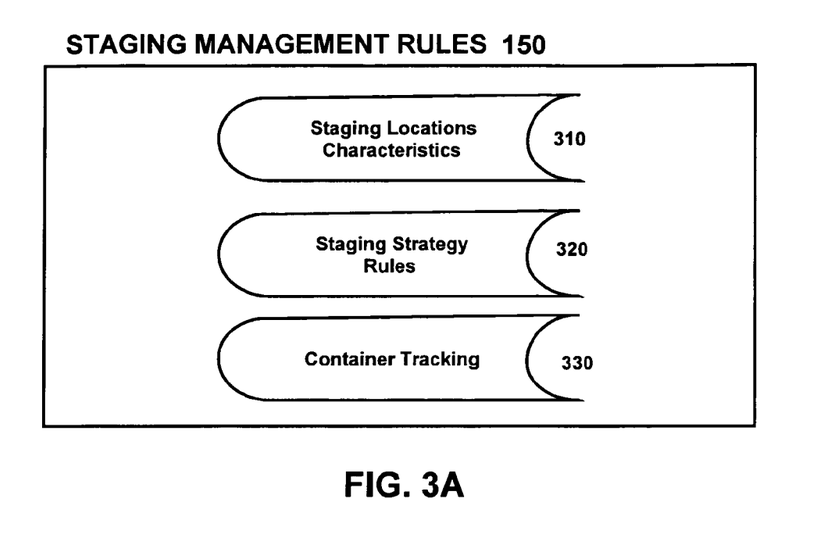
FIG. 3A is a block diagram illustrating staging management rules Incorporated into the item staged shipping and distribution analysis of FIG. 2.

FIG. 3A is a block diagram illustrating staging management rules 150 incorporated into the item staged shipping and distribution analysis of FIG. 2. Block 310 of FIG. 3A contains the characteristics or attributes of staging locations in a manufacturing and distribution system. Block 320 in turn contains a set of staging strategy rules. The staging strategy rules 320 can be based on each manufactured item or product and the details of the manufactured item, which can include a type of entity, type of order, type of container, type of item (machine or product), ship date factors, mode of shipment, carrier and shipping/staging location. Block 330 contains the item (container) tracking table. The item (container) tracking table is a transaction table that stores data for each container and its recommend/current location.

Figure 3B:
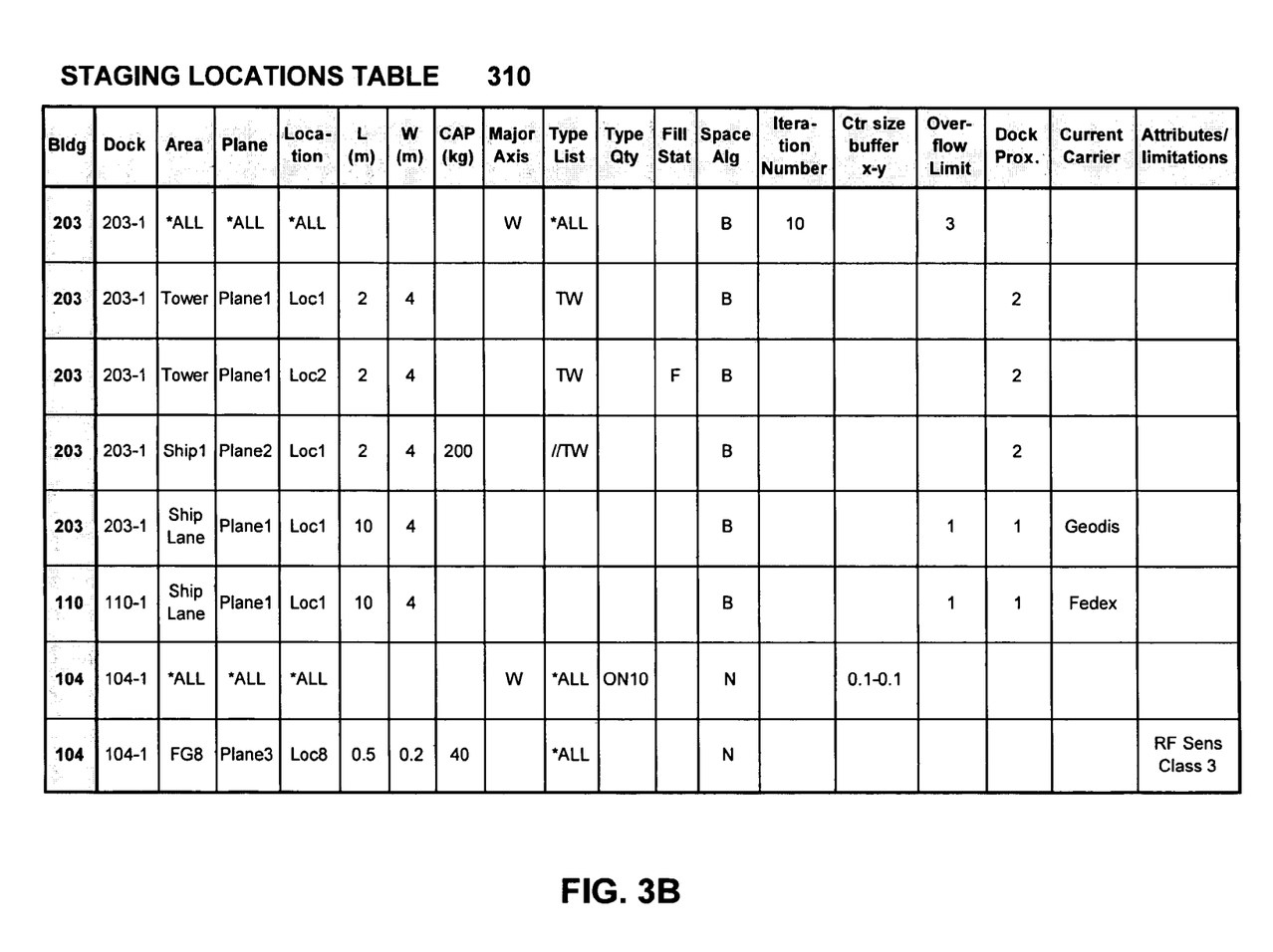
FIG. 3B is a block diagram illustrating staging location attributes incorporated into the item staged shipping and distribution analysis of FIG. 2.

FIG. 3B is a block diagram illustrating characteristics of the staging locations, which are incorporated into the item staged shipping and distribution analysis of FIG. 2. For example, block 310 captures the location characteristics, container dimensions, container positions and other attributes. In one embodiment, the first, second third and fourth columns of block 310 indicated the building, dock, area, location and plane of a particular staging location. Block 310 can further include length (L), width (W), weight capacity (CAP), preferred storage access side (Major Axis), type of containers permitted in a location (Type List) and quantity of a specific type of container (Type Qty), which can be used as a key for the grouping of homogeneous items of a defined staging location. In addition, block 312 also can include location fill status (Fill Stat), the version of the "space algorithm" to execute (Space Alg), a user-set hard limit for the number of iterations to run in the best fit space algorithm (Iteration Number) that can be used to obtain the best fit for multiple containers in the specified location, and buffer distance between containers in two dimensions (Ctr size buffer) that can be used for space fill calculations. Further characteristics of block 312 can include the allowable breakage of ship entities, carrier groupings, or other grouping types into multiple different locations (Overflow Limit), proximity value (Dock Prox) that can be used for ship date optimization, ship lane to carrier association (Current Carrier) and environmental limitations and characteristics (Attributes/limitations) that can be used in determining location availability when mapped to the same limitations/characteristics of the item containers.

Figure 3C:
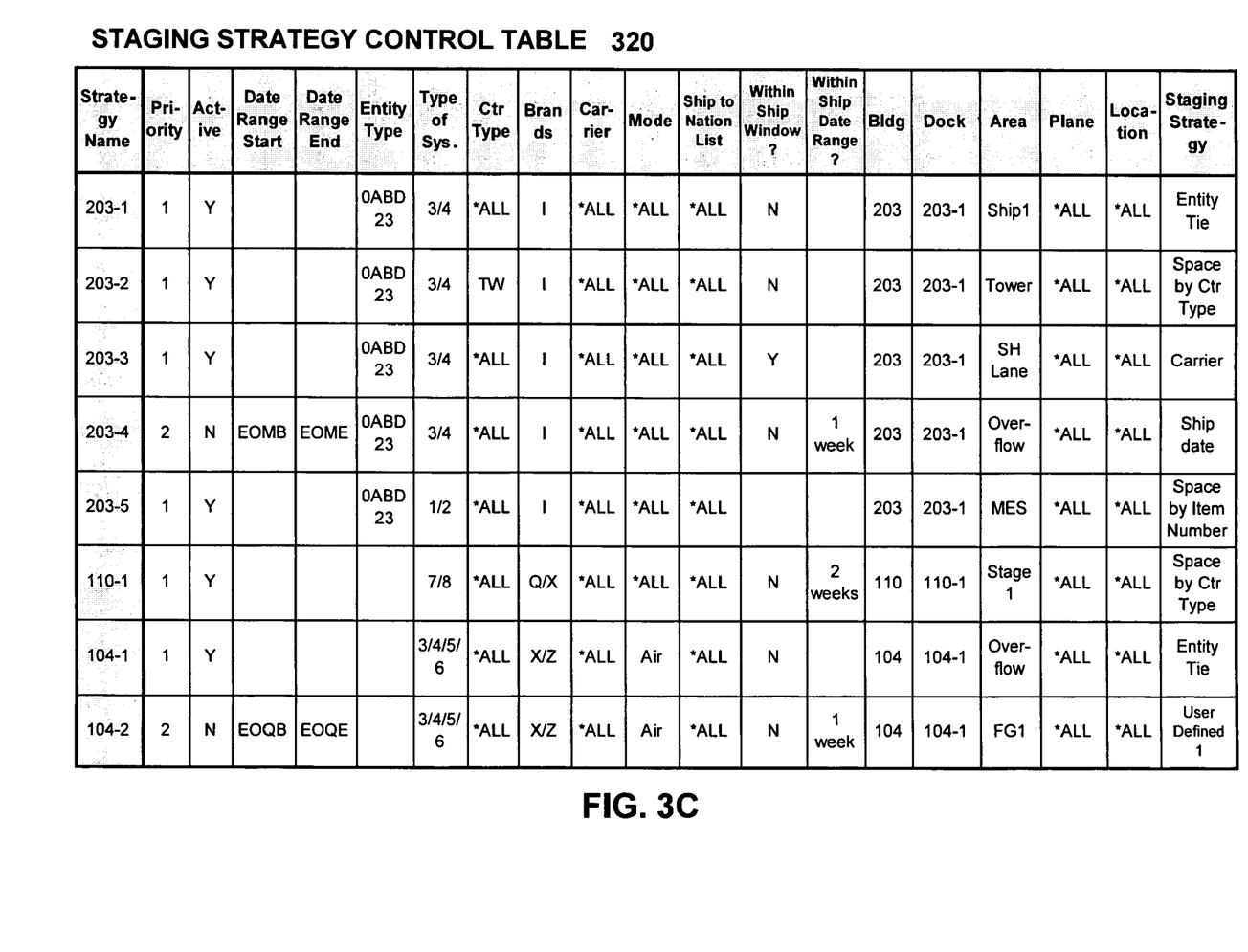
FIG. 3C is a block diagram illustrating staging strategy rules incorporated into the item staged shipping and distribution analysis of FIG. 2.

FIG. 3C is a block diagram illustrating characteristics of the staging strategy rules, which are incorporated into the item staged shipping and distribution analysis of FIG. 2. For example, block 320 captures the carrier, shipping, location attributes, container dimensions, container positions and other attributes. These attributes and values help define which staging strategy to apply to a certain area or location in the shipping and distribution system 130. The mapping shown in block 320 is used by the item staging process to ensure that staging location optimization is maintained. Each row of the block 320 shows the data corresponding to a strategy name, while each column shows one or more values associated with a manufactured item and attributes of a staging location. The first column of block 320 is populated with the strategy name, such as "203-1" which is a unique name that identifies a particular staging strategy.

The second column of block 320 is populated with a priority, which is a numerical value that indicates relative priority between multiple strategies applicable to one area. The third column of block 320 is populated with an active value, which indicates whether a strategy is in active use for a particular set of locations. The fourth and fifth columns of block 320 are populated with a date range, which sets the date range that a strategy is effective for this area.

The sixth through twelfth columns of block 320 are populated with various characteristics of the manufactured item (and container) such as entity type, type of system, container type, brand type, carrier names, mode of transport and ship to country list. The thirteenth and fourteenth columns of block 320 are populated with the ship window and the time until the ship window commences. The fifteenth through nineteenth columns are populated with the building, dock, area, location and plane of a particular staging location, similar to the same entries in the staging locations table of FIG. 3B. Finally, the sixteenth column identifies the chosen staging strategy for the designated location with the corresponding set of attributes and factors.

Figure 3D:
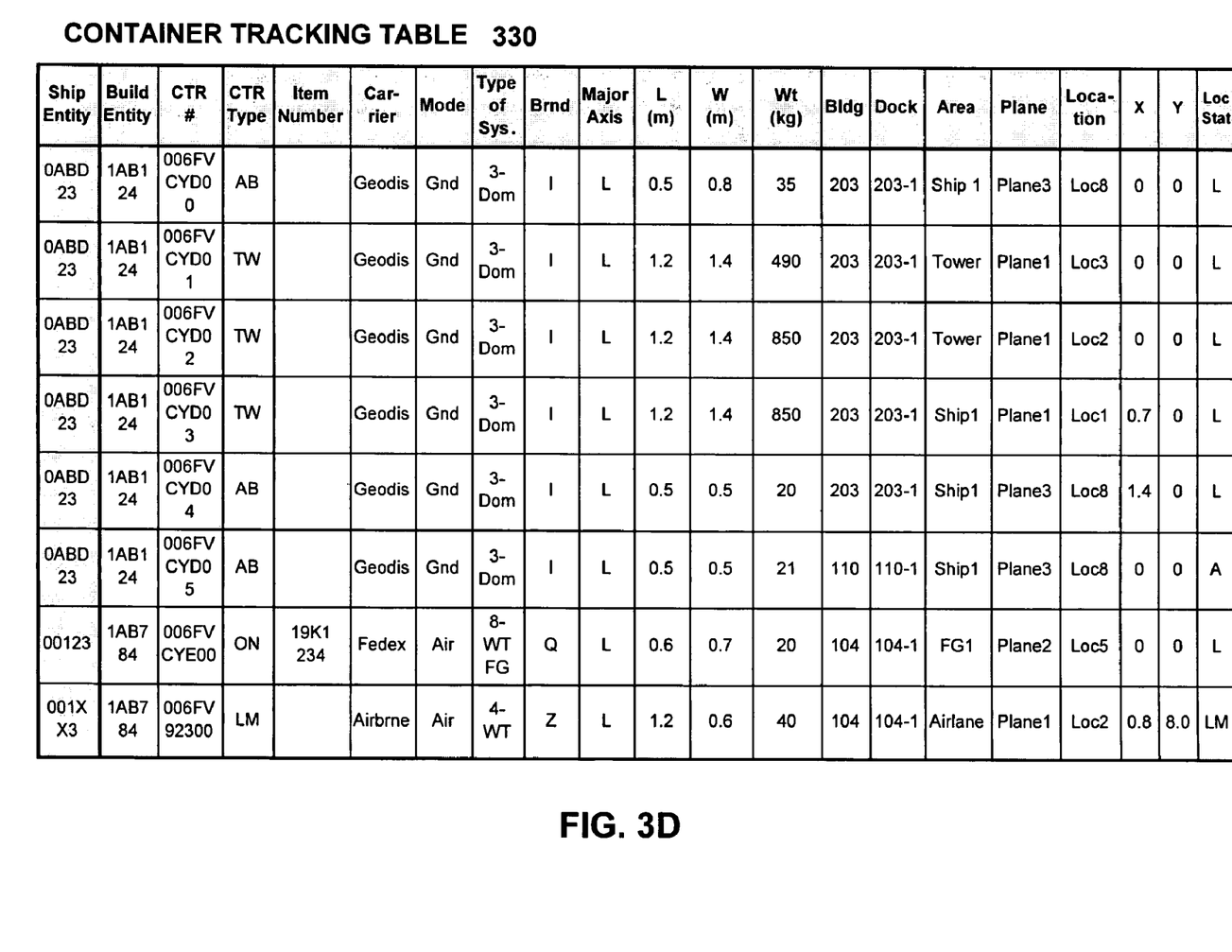
FIG. 3D is a block diagram illustrating item (container) tracking characteristics incorporated into the item staged shipping and distribution analysis of FIG. 2.

In further illustration, FIG. 3D is a block diagram illustrating characteristics of item (container) tracking, which are incorporated into the item staged shipping and distribution analysis of FIG. 2. Item (container) tracking block 330 tracks containers and their respective attributes/locations. For example, the fourteenth through eighteenth columns are populated with the building, dock, area, location and plane of a particular staging location, similar to the same entries in the staging locations block 310 of FIG. 3B and staging strategy block 320. The first through fifth columns of block 330 are populated with the ship entity, build entity, container number, container type code and item number. In this embodiment, the ship entity is a grouping of orders for shipment, the build entity is a grouping of orders for manufacturing assembly and test, and a container type code is a code for the type of container and this code provides for lookup of the characteristics of a container from a container characteristics block 340 (shown in FIG. 3E). The item number can be a part number for a finished good item built to a fixed structure, or it can be an association of grouping of entities to a unique number.

The container tracking block further can include a chosen carrier, a mode of transport, the type of system, the brand and the dimensions and preferred storage orientation for a container such as length, width, weight and major orientation axis. The nineteenth and twentieth columns are populated with values (X, Y) that indicate the grid position of the container relative to a 0, 0 point of the specified location. Finally the twenty-first column of block 330 can be populated with the location status for the container, such as located (L), assigned (A), not assigned (N), etc. In one embodiment, a movement status (M) can be added to any status indicator to indicate a container is to be moved to a new location, such as LM or NM.

Figure 3E:
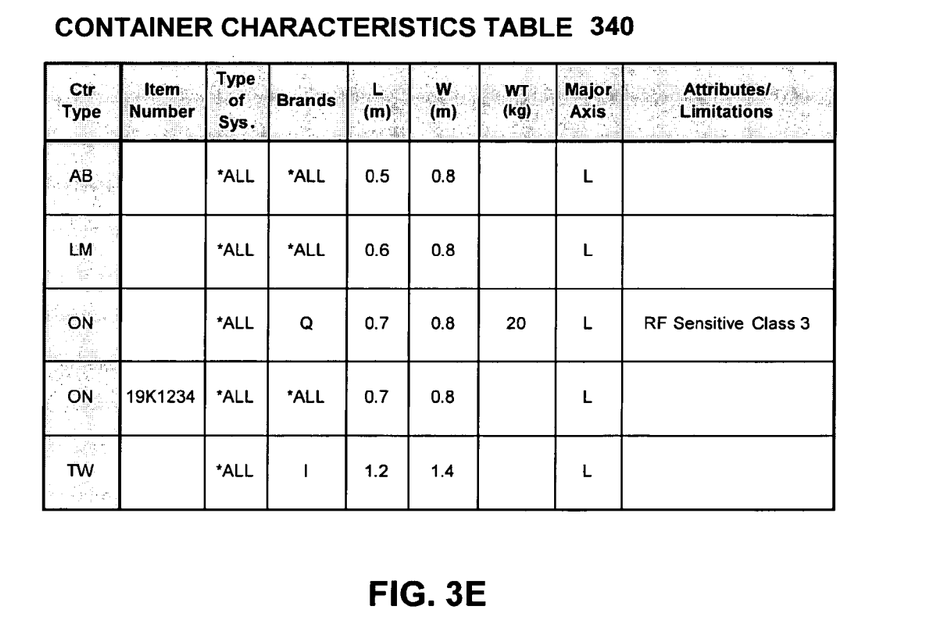
FIG. 3E is a block diagram illustrating container characteristics incorporated into the item staged shipping and distribution analysis of FIG. 2.

In further illustration, FIG. 3E is a block diagram illustrating characteristics of containers, which are incorporated into the item staged shipping and distribution analysis of FIG. 2. Container characteristics block 340 captures and contains characteristics associated with a container, such as container type, item number, type of system, container length, width, weight and preferred storage orientation for that container, e.g. major axis. Block 340 further can contain sets of miscellaneous environmental attributes, limitations and/or characteristics for a container, such as radio frequency (RF) sensitivity or temperature sensitivity.

Figure 4:
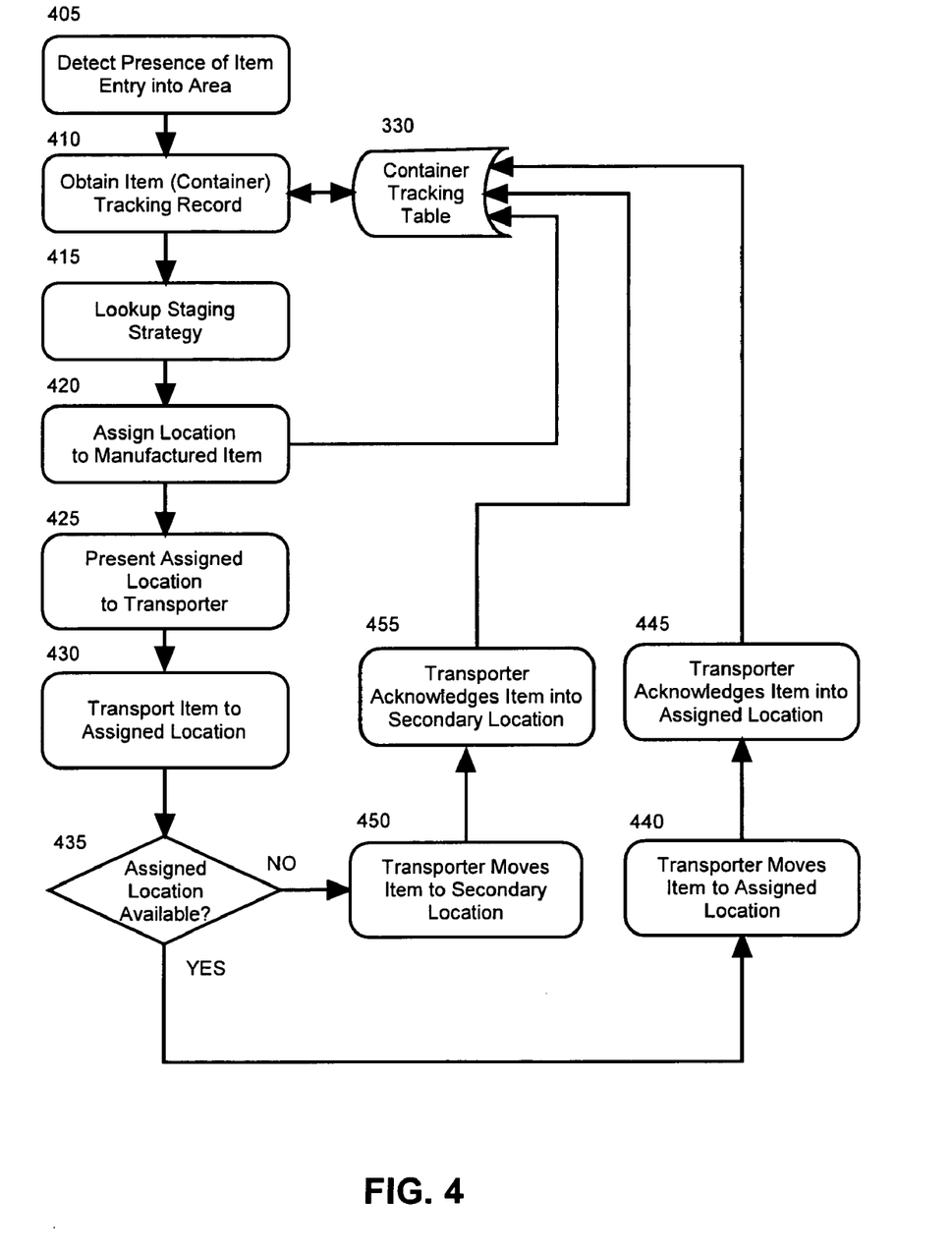
FIG. 4 is a flowchart illustrating a staging process utilized by the item staging engine of FIG. 1.

In still further illustration, FIG. 4 is a flowchart illustrating a staging (allocation) process utilized by the item staging engine 140 of FIG. 1. Beginning in block 405, the presence of a manufactured item entering a distribution and shipping system area can be detected and its item (container) tracking record can be obtained from the container tracking block 330. The container tracking block 330 can be stored in location and container data store 120 or another memory device. The information in the item (container) tracking record can be analyzed by the item staging engine 140 and a staging strategy can be selected based on this analysis. For example, in one embodiment the detected manufactured item can have a ship and/or build entity identifier that indicates that this detected manufactured item is "tied" by entity to a number of other manufactured items, which may or may not currently be staged. For this example, the strategy is to stage all items in the entity together by their entity identifiers in the staging and/or ship lane locations. As a result, an "entity-tie" staging strategy would be "looked up" or selected in block 415. In block 420, the selected staging strategy, e.g., "entity-tie", can be executed by the item staging engine 140 and a staging location can be assigned to this manufactured item. Notably, during the execution of the selected staging strategy, the attributes of the staging locations in block 310 are retrieved and analyzed. In addition, container tracking records of related manufactured items, such as those related to the detected manufactured item, e.g., "entity-tied", are analyzed to determine where these other related manufactured items are staged. As a result of this analysis, a staging location can be assigned to the detected manufactured item that will optimize the staging of the entity-tied set of items.

In the above example, there can be several staging combinations and/or iterations. For example, all items can be staged in staging locations prior to retrieval and transport to the ship lanes. Alternatively, some items can be staged but some items can proceed directly to the ship lanes. For example, some items are staged, however a ship window is available, so when the last item arrives, all the other items are retrieved (or "pulled") from their respective staging locations and transported to the appropriate ship lanes. In addition, all the items can move directly to the ship lanes as they arrive from manufacturing. In some ways, the ship lanes can be treated as just another staging location and the assignment of a "staging location" to a manufactured item can be a ship lane. The staging-retrieval logic can be invoked multiple times as needed to stage and move the item through the distribution area.

In another embodiment, the detected manufactured item can have a specific container type but no entity type. In this embodiment, priority can be assigned to staging all items having the same container type in the same location or area. As such, a staging strategy by container type can be selected in block 415 and executed in block 420 to determine a staging location that may have user-defined attributes requiring that specific container type. In other words, the container type staging strategy ensures that all containers of a particular size and type are located together either within an area or a certain location. Other embodiments provide for selecting other staging strategies. For example, in one embodiment the carrier type and mode are priority factors in the selection of a staging strategy. Accordingly, if the detected manufactured item had a specific carrier identified for its shipping, then a carrier type staging strategy would be selected in block 415 and executed in block 420 to determine a staging location that may have user-defined attributes requiring that specific carrier type. In another embodiment, the item number is a priority factor in the selection of a staging strategy. Accordingly, if the detected manufactured item had a specific item number, then an item number staging strategy would be selected in block 415 and executed in block 420 to determine a staging location that may have user-defined attributes requiring that specific item number.

In yet another embodiment, the detected manufactured item can have a specific ship date. In this embodiment, priority can be assigned to staging all items having the same ship date in the same location or area. As such, a staging strategy by ship date can be selected in block 415 and executed in block 420 to determine a staging location that may have user-defined attributes requiring that specific ship date. In other words, the ship date staging strategy ensures that all containers having a particular ship date will be staged together. Moreover, the ship date staging strategy provides that for those manufactured items awaiting shipment with far away ship dates are staged physically far away to the ship lanes while those manufactured items having close ship dates are staged close to the ship lanes. In addition, other "user-defined" staging strategies can be defined, selected and executed by the item staging engine 140. For example, a type of system identifier could be defined as the priority determining factor for selection of a staging strategy. Finally, in other embodiments, combinations of staging strategies are used to provide the optimal staging of the manufactured items. For example, a dock is shipping a particular brand of manufactured items, e.g., brand I. All brand I manufactured items are "entity-tied" new build machines, and the strategy is to stage these brand I items by contain size. The small containers that are entity tied are kept together, while the large containers, e.g., tower containers, are kept in separate individual tower box locations. Consequently, the above embodiment is a combination of the entity tie staging strategy with the container type staging strategy.

In another embodiment, a "user-defined" staging strategy can be selected as the staging strategy in block 415. The user-defined staging strategy can provide a user with significant flexibility in customizing a staging strategy for use in the user's manufacturing facility. As such, a user-defined staging strategy can prioritize, which characteristics are used to determine the staging of a manufactured item. As such, a user-defined staging strategy can receive data input related to the staging locations, the containers in an entity, location fill information, etc. and assign an appropriate staging location.

In block 425, the assigned location can be presented to an interface, e.g., a console of an operator or the receiver of an automated machine, of a transporter, e.g., a device or person. Upon presentation of the assigned location, the transporter transports the manufactured item to the assigned location. In decision block 435, a determination is made as to the availability of the assigned location. If the assigned location is available, the transporter moves the item into the assigned staging location in block 440 and then acknowledges that the item is in the assigned area to report the successful move of the item to the assigned location in block 445. Otherwise, if the assigned location is unavailable, the transporter can move the item into a secondary staging location in block 450 and then acknowledges that the item is in the secondary location to report the successful override move of the item to the secondary location in block 455. The appropriate record of item (container) tracking block 330 is updated to reflect the physical location of the manufactured item with either the assigned location or the secondary location.

Figure 5:
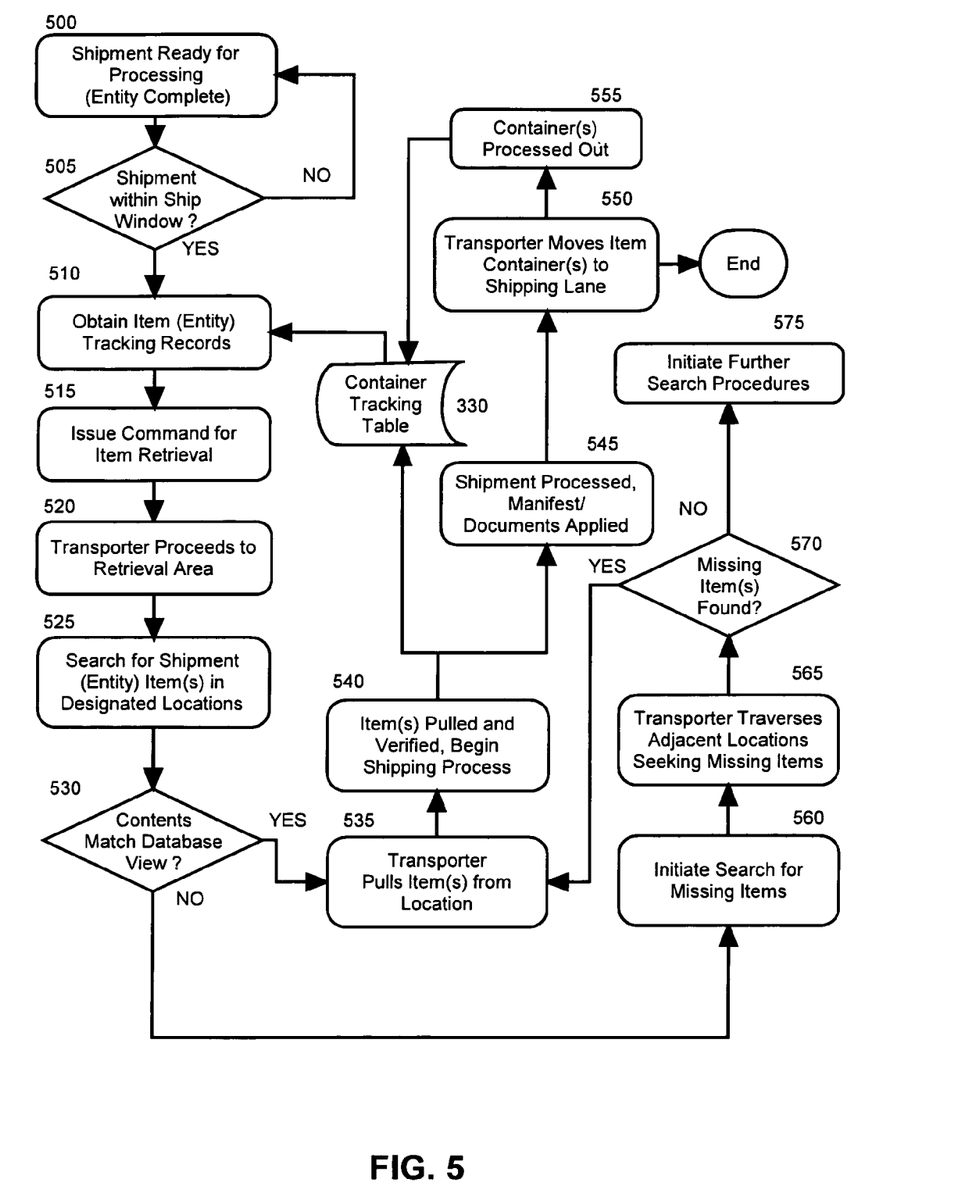
FIG. 5 is a flowchart illustrating a retrieval process utilized by the item staging engine of FIG. 1.

In still further illustration, FIG. 5 is a flowchart illustrating a retrieval process utilized by the item staging engine of FIG. 1. Beginning in block 500, an indication that a shipment is complete and ready for processing is received, such as the completion of a ship entity. In decision block 505, it can be determined if shipment is with its ship window. If so, in block 510 the item staging location information can be pulled from the item (container) tracking block 330 and a command to retrieve the item for storage can be issued to a transporter in block 515. Otherwise, the retrieval process can return to block 500 or merely wait until the ship window commences for that particular shipment. In block 520, the transporter proceeds to the designated retrieval area or location and searches for the shipment (entity) item(s) in the designated locations in block 525.

In decision block 530, it can be determined if the contents of the designated locations match the item (container) tracking block 330 of location and container data store 120. If so, in block 535 the transporter pulls the item(s) from the designated locations, verifies the items pulled and commences the shipping process in block 540. In block 545, the shipment is processed and the proper manifests and/or documents are applied to the processed shipment and the transporter can move the item containers to the ship lanes in block 550 where the item containers are processed out in block 555. If however the contents of the designated locations do not match the item (container) tracking block 330 of location and container data store 120, then a missing items search can be initiated in block 560. In block 565, the transporter can traverse adjacent locations in an attempt to locate the missing items. In decision block 570, it can be determined if the missing items were found. If so, the transporter can pull the items in block 535. Otherwise, in block 575 further search procedures can be initiated. In either case, the status of the moved containers can be reported back to the item (container) tracking block 330.

The present invention can be realized in hardware, software, or a combination of hardware and software. An implementation of the method and system of the present invention can be realized in a centralized fashion in one computer system or in a distributed fashion where different elements are spread across several interconnected computer systems. Any kind of computer system, or other apparatus adapted for carrying out the methods described herein, is suited to perform the functions described herein.

A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for staging items in a manufacturing environment, the method comprising:
    defining attributes of staging locations in a distribution area of the manufacturing environment;
    defining a set of staging strategies for use in the distribution area of the manufacturing environment;
    receiving a manufactured item in the distribution area and obtaining characteristics of the manufactured item;
    comparing the obtained characteristics of the manufactured item to the set of staging strategies to select the staging strategy to apply to the manufactured item;
    applying the selected staging strategy to the manufactured item to assign the manufactured item to storage in one of the staging locations in the distribution area based on matching the obtained characteristics of the manufactured item to the defined attributes of the one of the staging locations; and,
    applying space optimization usage logic to the assigned staging location to determine a storage position for the manufactured item in the assigned staging location based on container characteristics of the manufactured item.

2. The method of claim 1, further comprising transporting the manufactured item to the assigned staging location.

3. The method of claim 1, further comprising updating an item tracking record to reflect the assigned staging location.

4. The method of claim 1, wherein selecting the staging strategy to apply to the manufactured item comprises obtaining an entity type characteristic of the manufactured item and selecting an entity tie staging strategy.

5. The method of claim 1, wherein selecting the staging strategy to apply to the manufactured item comprises obtaining a container type characteristic of the manufactured item and selecting a container type staging strategy.

6. The method of claim 1, wherein selecting the staging strategy to apply to the manufactured item comprises obtaining a carrier type characteristic of the manufactured item and selecting a carrier type staging strategy.

7. The method of claim 1, wherein selecting the staging strategy to apply to the manufactured item comprises obtaining an item number type characteristic of the manufactured item and selecting an item number staging strategy.

8. The method of claim 1, wherein selecting the staging strategy to apply to the manufactured item comprises obtaining ship date and ship window type characteristics of the manufactured item and selecting a ship date staging strategy.

9. The method of claim 1, further comprising retrieving the manufactured item from the assigned staging location and placing the manufactured item in a ship lane based on a completed entity type and entry into an entity ship window.

10. A system for staging items in a manufacturing environment, the system comprising:
- a data store of manufactured items and staging locations for storing the manufactured items;
- an item staging engine communicatively coupled to a distribution system and the data store; and
- item staging logic comprising program code enabled to define attributes of staging locations in a distribution area of the manufacturing environment, to define a set of staging strategies for use in the distribution area of the manufacturing environment to receive one of the manufactured items in the distribution area and obtain characteristics of the manufactured item, to compare the obtained characteristics of the manufactured item to the set of staging strategies and select the staging strategy to apply to the manufactured item, and to apply the selected staging strategy to the manufactured item and assign the manufactured item to storage in one of the staging locations based on matching the obtained characteristics of the manufactured item to the defined attributes of the one of the staging locations.

11. The system of claim 10, wherein the selected staging strategy is one of an entity tie type, container type, carrier type, item number type, ship date type and user-defined type.

12. The system of claim 10, further comprising user interfaces for interfacing a user with the distribution system and a manufacturing floor control system.

13. The system of claim 10, further comprising a tracking system to sense entry of the manufactured item into the distribution area and track the movement of the manufactured item in the distribution system.

14. A computer program product comprising a computer usable medium embodying computer usable program code for staging items in a manufacturing environment, the computer program product comprising:
- computer usable program code for defining attributes of staging locations in a distribution area of the manufacturing environment;
- computer usable program code for defining a set of staging strategies for use in the distribution area of the manufacturing environment;
- computer usable program code for receiving a manufactured item in the distribution area and obtaining characteristics of the manufactured item;
- computer usable program code for comparing the obtained characteristics of the manufactured item to the set of staging strategies to select the staging strategy to apply to the manufactured item;
- computer usable program code for applying the selected staging strategy to the manufactured item to assign the manufactured item to storage in one of the staging locations in the distribution area based on matching the obtained characteristics of the manufactured item to the defined attributes of the one of the staging locations; and,
- further comprising computer usable program code for applying space optimization usage logic to the assigned staging location to determine a storage position for the manufactured item in the assigned staging location based on container characteristics of the manufactured item.

15. The computer program product of claim 14, further comprising computer usable program code for transporting the manufactured item to the assigned staging location.

16. The computer program product of claim 14, further comprising computer usable program code for updating an item tracking record to reflect the assigned staging location.

17. The computer program product of claim 14, wherein the computer usable program code for selecting the staging strategy to apply to the manufactured item comprises obtaining an entity type characteristic of the manufactured item and selecting an entity tie staging strategy.

18. The computer program product of claim 14, wherein the computer usable program code for selecting the staging strategy to apply to the manufactured item comprises obtaining a container type characteristic of the manufactured item and selecting a container type staging strategy.

* * * * *